(12) United States Patent
Matsumoto et al.

(10) Patent No.: US 11,108,711 B2
(45) Date of Patent: Aug. 31, 2021

(54) CONTROL DEVICE, CONTROL SYSTEM, AND NON-TRANSITORY COMPUTER READABLE MEDIUM STORING CONTROL PROGRAM

(71) Applicant: FUJIFILM Business Innovation Corp., Tokyo (JP)

(72) Inventors: Ryo Matsumoto, Kanagawa (JP); Satoshi Maruyama, Kanagawa (JP); Yohei Makino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/521,565

(22) Filed: Jul. 24, 2019

(65) Prior Publication Data

US 2020/0304439 A1 Sep. 24, 2020

(30) Foreign Application Priority Data

Mar. 20, 2019 (JP) .............................. JP2019-052971

(51) Int. Cl.
*G06F 15/16* (2006.01)
*H04L 12/58* (2006.01)

(52) U.S. Cl.
CPC .............. *H04L 51/04* (2013.01); *H04L 51/02* (2013.01)

(58) Field of Classification Search
CPC ....... H04L 51/04; H04L 51/02; H04L 51/046; H04L 51/18
See application file for complete search history.

(56) References Cited

U.S. PATENT DOCUMENTS

| 9,621,492 | B2 | 4/2017 | Park et al. | |
|---|---|---|---|---|
| 2008/0120369 | A1* | 5/2008 | Gustavsson | H04L 67/1095 709/204 |
| 2013/0166275 | A1 | 6/2013 | Yang et al. | |
| 2013/0262574 | A1* | 10/2013 | Cohen | H04L 51/18 709/204 |
| 2014/0032684 | A1* | 1/2014 | Chung | H04L 51/04 709/206 |
| 2015/0242723 | A1* | 8/2015 | Tokushima | G06F 3/1282 358/1.15 |
| 2016/0043975 | A1 | 2/2016 | Park et al. | |
| 2018/0167451 | A1* | 6/2018 | Yi | G06K 9/6201 |

FOREIGN PATENT DOCUMENTS

| JP | 2014225268 | 12/2014 |
|---|---|---|
| JP | 2015144027 | 8/2015 |
| JP | 2015179519 | 10/2015 |

* cited by examiner

*Primary Examiner* — Anh Nguyen
(74) *Attorney, Agent, or Firm* — JCIPRNET

(57) ABSTRACT

A control device includes a generation unit that in a case where a first user, belonging to a talk room where each of plural users posts and browses information, posts a file and instruction information including an instruction to execute processing on the file, for a second user different from the first user, to the talk room, generates an individual talk room to which the second user belongs and which receives the post related to the file, separately from the talk room to which the instruction information is posted.

19 Claims, 13 Drawing Sheets

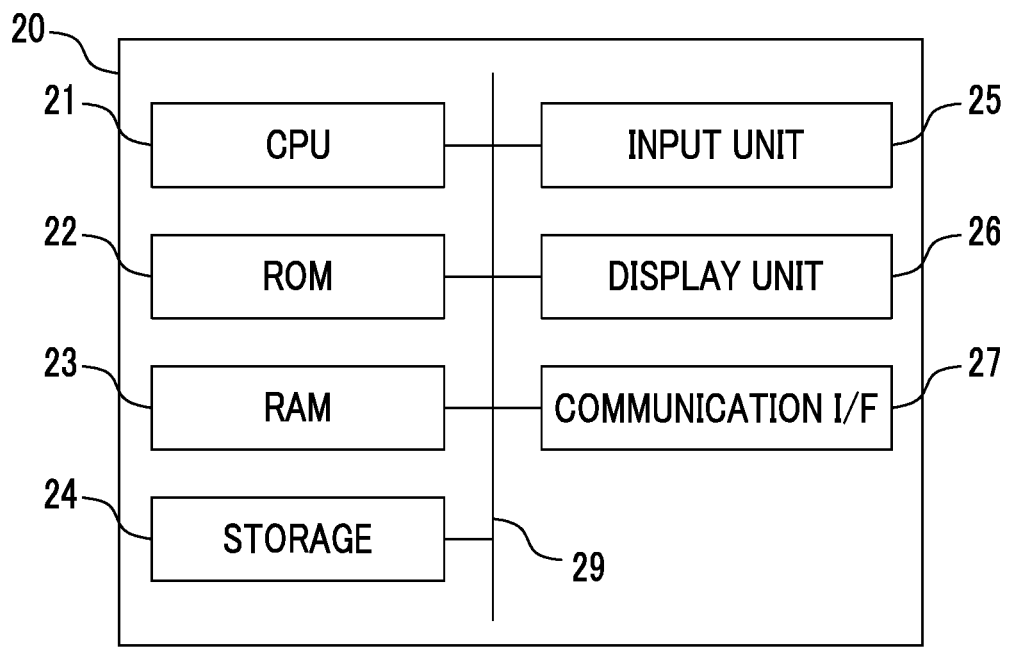
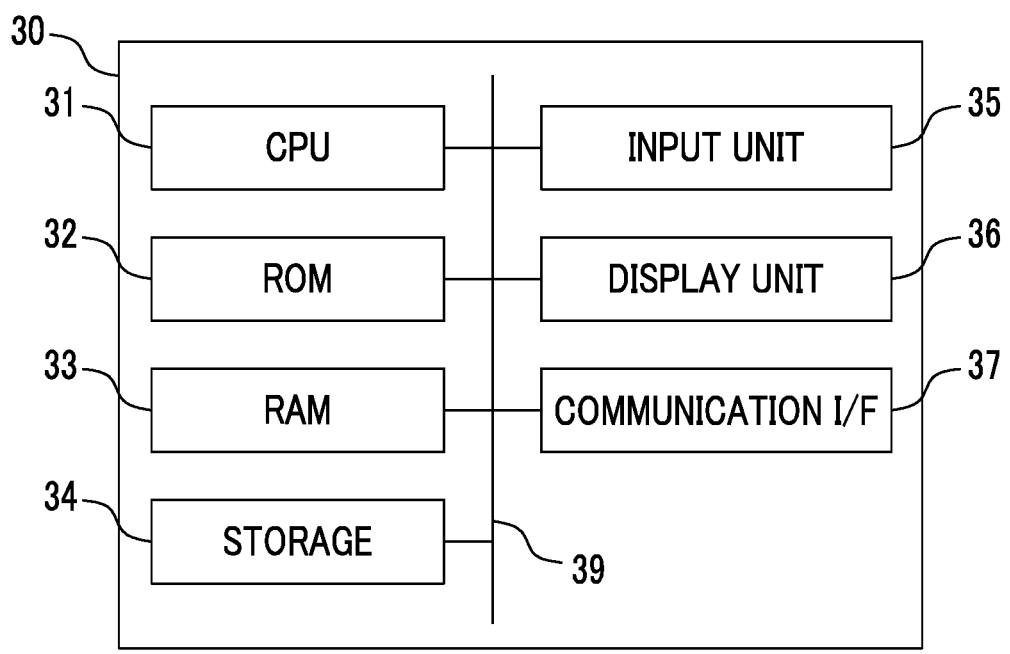

CONTROL DEVICE, CONTROL SYSTEM, AND NON-TRANSITORY COMPUTER READABLE MEDIUM STORING CONTROL PROGRAM

CROSS-REFERENCE TO RELATED APPLICATIONS

This application is based on and claims priority under 35 USC 119 from Japanese Patent Application No. 2019-052971 filed Mar. 20, 2019.

BACKGROUND

(i) Technical Field

The present invention relates to a control device, a control system, and a non-transitory computer readable medium storing a control program.

(ii) Related Art

JP2015-179519A proposes an information providing system in which a user adds a virtual friend software robot realized by an artificial intelligence software program as a friend, through an instant messaging application executed on a user terminal. In detail, the information providing system receives a message from the user terminal through a talk session in which the software robot participates, and provides a response message by the software robot participating in the talk session to the user terminal through the talk session.

JP2015-144027A proposes a control server that in a case where the contents of a message are a control instruction for a predetermined electrical device, writes a message corresponding to the control instruction and including an expression that reminds that the electrical device is the subject of the message on an electronic message board.

JP2014-225268A proposes an information providing system that executes an information providing method through an instant messaging application. In detail, the information providing system receives a message that the user sends to a software robot through the messaging application of a user terminal. Then, a response is retrieved from a database using the message as a query, and the response is sent to the user through the messaging application of the user terminal.

SUMMARY

There has been a technique capable of executing processing corresponding to a posted instruction, in a case where a user has posted a specific processing instruction, in a talk room where each of plural users can post and view information.

Aspects of non-limiting embodiments of the present disclosure relate to a control device, a control system, and a non-transitory computer readable medium storing a control program, capable of suppressing complication of posting in a talk room, as compared with a case where another user makes posting for executing processing based on an instruction in the same talk room, according to the instruction for the other user made in the talk room.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control device including a generation unit that in a case where a first user, belonging to a talk room where each of plural users posts and browses information, posts a file and instruction information including an instruction to execute processing on the file, for a second user different from the first user, to the talk room, generates an individual talk room to which the second user belongs and which receives the post related to the file, separately from the talk room to which the instruction information is posted.

BRIEF DESCRIPTION OF THE DRAWINGS

Exemplary embodiment(s) of the present invention will be described in detail based on the following figures, wherein:

FIG. 2 is a block diagram showing a hardware configuration of a talk room server;

FIG. 3 is a block diagram showing a hardware configuration of a chat bot server;

DETAILED DESCRIPTION

Figure 1:
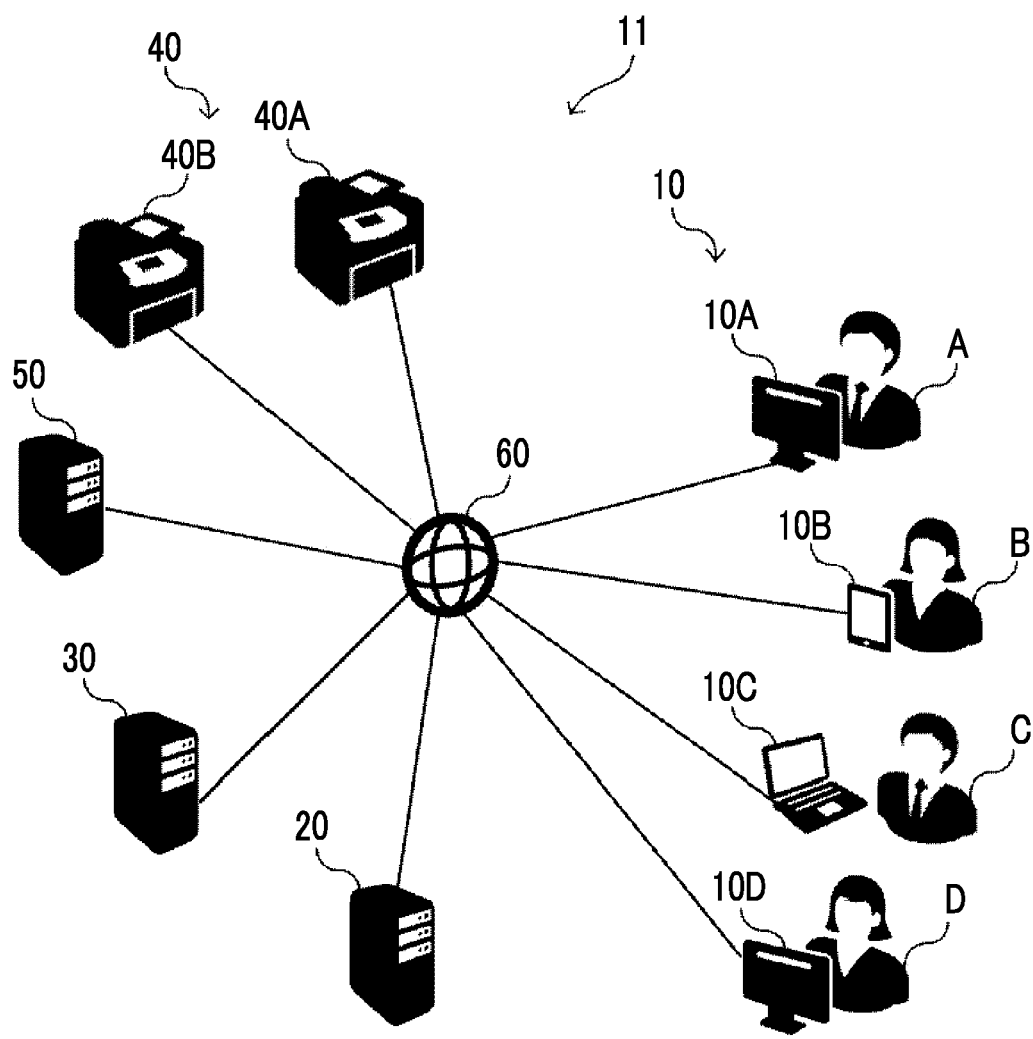
FIG. 1 is a diagram showing a schematic configuration of a control system according to the present exemplary embodiment.

Hereinafter, an exemplary embodiment of the present invention will be described in detail with reference to the accompanying drawings. In the drawings, the same or equivalent components and parts are denoted by the same reference numerals. Further, the dimensional proportions in the drawings are exaggerated for the convenience of the description, and may differ from the actual proportions. FIG. 1 is a diagram showing a schematic configuration of a control system according to the present exemplary embodiment.

The control system 11 includes a user terminal 10, a talk room server 20 as a providing device, a chat bot server 30 as a control device, an information processing apparatus 40, and a document server 50. The user terminal 10, the talk room server 20, the chat bot server 30, the information processing apparatus 40, and the document server 50 are mutually connected by a communication line 60 such as the Internet.

The user terminal 10 is a terminal used by the user, and may be any terminal such as a desktop computer, a notebook computer, a tablet or a smartphone. In FIG. 1, it is assumed that the user A uses the user terminal 10A, the user B uses the user terminal 10B, the user C uses the user terminal 10C, and the user D uses the user terminal 10D. The user terminals 10A to 10D are collectively referred to as the user terminal 10.

The talk room server 20 provides a talk room as a service. The talk room is a virtual space in which a user and a chat bot, which will be described later, participate together to share messages and files (for example, electronic files such as image files and document files) as chats. Here, chat means that plural members input information and exchange conversations in real time on a computer network. Here, a member includes both a user associated with a real person and a software robot operating according to a specific rule. Further, a chat bot is a software robot that controls execution of a specific process based on information posted by a user on a talk room. In addition, the user who participates in a talk room may be plural or may be one user.

The user can post or speak a message through the user terminal 10 in the talk room. In the talk room, users can share messages, and chat bots can respond to user messages. In addition, it is possible for the user to give the chat bot an instruction for causing the information processing apparatus 40 to execute a specific process in the talk room. The chat bot extracts an instruction included in the message, for example, by natural language processing, and controls the information processing apparatus 40 to execute a specific process. In the talk room, it is possible for a user and a chat bot to participate on a one-on-one basis, and plural users and a chat bot to participate. There may be plural talk rooms as many as the generated number.

The chat bot server 30 is a server that manages chat bots. As described above, the chat bot participates in the talk room, responds to the user's message, or causes the information processing apparatus 40 to execute a specific process according to an instruction included in the message.

In a case where a message regarding an instruction for causing the information processing apparatus 40 to execute a specific process is posted in the participating talk room, the chat bot controls the information processing apparatus 40 which is registered in association with the user participating in the talk room to execute a specific process. The information processing apparatus 40 may be an apparatus that performs any information processing. Here, the information processing includes, for example, a process for executing printing as an example of output of a file such as a document file or an image file, a process for editing a file, processing for generating or processing information using equipment included in the information processing apparatus 40, a process for sending and receiving information between the information processing apparatus 40 and another apparatus, and the like. The output of a file is not limited to printing, but includes conversion of a file format or the like. In the following, a case where the information processing apparatus 40 is an image forming apparatus and an instruction to execute a specific process is an instruction to execute printing will be described as an example. Hereinafter, the image forming apparatus will be described with reference numeral 40. The instruction to execute printing may include not only a direct printing instruction for the image forming apparatus 40 but also provision of information necessary for generating a print job, for example, an image file to be printed, specifications of printing, or the like in the talk room.

The image forming apparatus 40 is an apparatus for forming an image on a recording medium such as a sheet based on a print job, and may be any apparatus such as a printer or a multifunction peripheral. In the example of the control system of FIG. 1, the image forming apparatus 40A and the image forming apparatus 40B are managed by the chat bot server 30. The image forming apparatus 40A and the image forming apparatus 40B are collectively referred to as the image forming apparatus 40. In the illustrated example, the image forming apparatus is connected to the chat bot server 30 through the communication line 60, but the image forming apparatus 40 may be connected to the chat bot server 30.

The document server 50 stores files such as document files and image files to be printed by the image forming apparatus 40. The files stored in the document server 50 can be browsed and edited in accordance with an instruction from the chat bot server 30 or the user terminal 10. The function of the document server 50 may be provided in the talk room server 20 or the chat bot server 30.

Next, hardware configurations of the talk room server 20, the chat bot server 30, and the document server 50 will be described.

First, the hardware configuration of the talk room server 20 will be described. FIG. 2 is a block diagram showing the hardware configuration of the talk room server 20.

As shown in FIG. 2, the talk room server 20 has respective components of a central processing unit (CPU) 21, a read only memory (ROM) 22, a random access memory (RAM) 23, a storage 24, an input unit 25, a display unit 26, and a communication interface (I/F) 27. The respective components are communicably connected to each other through a bus 29.

The CPU 21 is a central processing unit, and executes various programs or controls each part. That is, the CPU 21 reads a program from the ROM 22 or the storage 24, and executes the program using the RAM 23 as a work area. The CPU 21 controls the above-described components and performs various arithmetic processes in accordance with the program stored in the ROM 22 or the storage 24. In the present exemplary embodiment, the ROM 22 or the storage 24 stores a talk room providing program for providing a talk room.

The ROM 22 stores various programs and various types of information. The RAM 23 as a work area temporarily stores a program or information. The storage 24 includes a hard disk drive (HDD) or a solid state drive (SSD), and stores various programs including an operating system and various types of information.

The input unit 25 includes a pointing device such as a mouse and a keyboard, and is used to perform various inputs. The display unit 26 is, for example, a liquid crystal display, and displays various types of information. The display unit 26 may function as the input unit 25 by adopting a touch panel method. The communication interface 27 is an interface for communicating with another device through the communication line 60, and for example, a standard such as Ethernet (registered trademark), FDDI, Wi-Fi (registered trademark) or the like is used.

Next, the hardware configuration of the chat bot server 30 will be described. FIG. 3 is a block diagram showing the hardware configuration of the chat bot server 30.

As shown in FIG. 3, the chat bot server 30 has respective components of a CPU 31, a ROM 32, a RAM 33, a storage 34, an input unit 35, a display unit 36, and a communication interface (I/F) 37. The respective components are communicably connected to each other through a bus 39. The respective components of the chat bot server 30 have the same function as the respective components of the talk room server 20 of FIG. 2.

Figure 4:
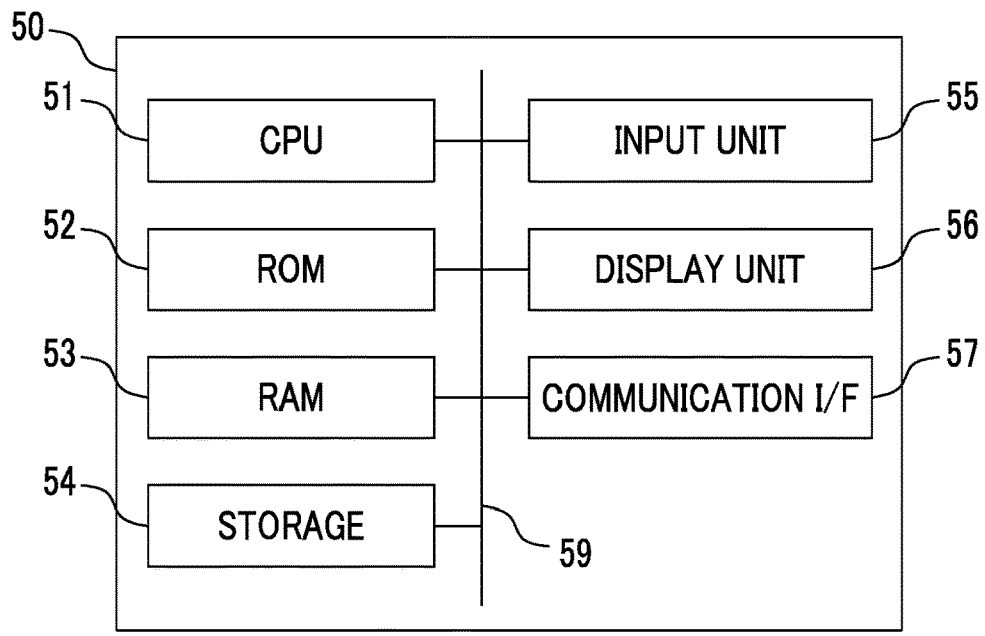
FIG. 4 is a block diagram showing a hardware configuration of a document server.

Next, the hardware configuration of the document server 50 will be described. FIG. 4 is a block diagram showing the hardware configuration of the document server 50.

As shown in FIG. 4, the document server 50 has respective components of a CPU 51, a ROM 52, a RAM 53, a storage 54, an input unit 55, a display unit 56, and a communication interface (I/F) 57. The respective components are communicably connected to each other through a bus 59. The respective components of the document server 50 have the same functions as the respective components of the talk room server 20 of FIG. 2.

Subsequently, functional configurations of the talk room server 20 and the chat bot server 30 will be described.

Figure 5:
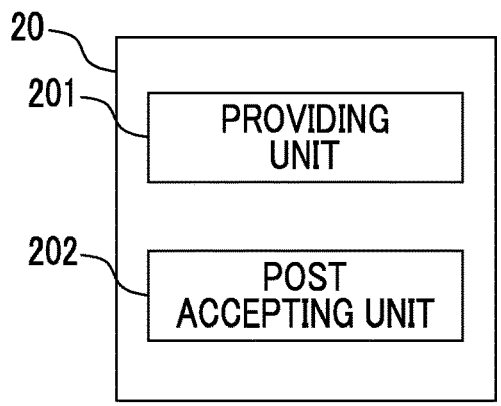
FIG. 5 is a block diagram showing an example of a functional configuration of the talk room server.

First, the functional configuration of the talk room server 20 will be described. FIG. 5 is a block diagram showing an example of a functional configuration of the talk room server 20.

As shown in FIG. 5, the talk room server 20 has functional configurations of a providing unit 201 and a post accepting unit 202, as functional configurations. The functional configurations are realized by the CPU 21 reading out a talk room providing program stored in the ROM 22 or the storage 24 and developing the program on the RAM 23 for execution.

The providing unit 201 provides a talk room in which a plurality of users can participate and post messages, as a service. The talk room server 20 provides a talk room in which a user and a chat bot participate on a one-on-one basis, a talk room in which plural users and a chat bot participate, and the like. Plural talk rooms may be generated according to a generation request from the user. Further, for example, in a case where a certain user accesses the talk room server 20 and makes a request to generate a talk room, and a specific talk room is generated, the user who is the requester can invite other users to the generated talk room and let the users participate. Alternatively, in a case where the user participating in the talk room, other users not participating in the talk room can be invited to the talk room to newly participate.

The post accepting unit 202 accepts information input through the user terminal 10 operated by the user participating in the talk room, and posts the input information on the talk room provided by the providing unit 201. The information posted to the talk room is displayed on the user terminal 10 in the posting order along a predetermined direction.

Figure 6:
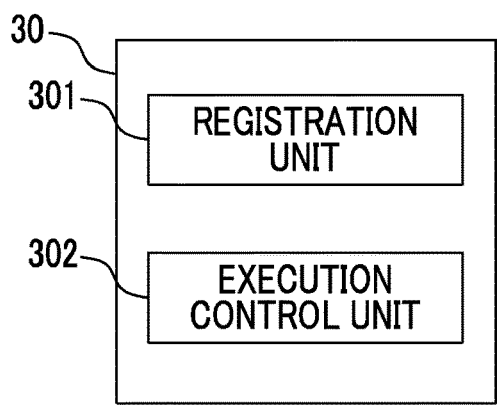
FIG. 6 is a block diagram showing an example of a functional configuration of the chat bot server.

Subsequently, the functional configuration of the chat bot server 30 will be described. FIG. 6 is a block diagram showing an example of a functional configuration of the chat bot server 30.

As shown in FIG. 6, the chat bot server 30 has functional configurations of a registration unit 301 and an execution control unit 302, as functional configurations. Each functional configuration is realized by the CPU 31 reading out a control program stored in the ROM 32 or the storage 34 and developing the program in the RAM 33 for execution. The execution control unit 302 corresponds to a generation unit, a prohibition unit, a deletion unit, a restriction unit, and an execution restriction unit.

The registration unit 301 registers, for example, the user and the image forming apparatus 40 in association with each other. By registering the image forming apparatus 40 in association with the user, printing using the image forming apparatus 40 is performed in response to the request of the user.

The execution control unit 302 participates in the talk room as a chat bot, controls conversation with the users participating in the talk room, and controls execution of processing such as printing or editing according to the post from the user. Then, the execution control unit 302 posts the result of the execution. For example, in a case where in the talk room, an instruction for causing the image forming apparatus (an example of the information processing apparatus) 40 to execute printing is received, or the instruction message regarding the instruction is posted by the user, the execution control unit 302 controls one image forming apparatus 40 of the image forming apparatuses 40 associated with the users participating in the talk room to execute printing. The execution control unit 302 controls one image forming apparatus 40 to execute printing, even in a case where an instruction message is posted to the talk room by a user who is not associated with the image forming apparatus 40. In a case where editing of a file is accepted as an instruction to execute a process, the execution control unit 302 edits the file according to the post. For example, as an instruction to edit a file, in a case where an image is present in a file and it is desired to execute editing to replace the image with another image, an image file of another image is posted, and a message such as "the image in the file is changed to this image" is posted. In response to this instruction, the execution control unit 302 performs a process to change the image in the file to another image. Then, the edited file is posted to the talk room.

Further, the execution control unit 302 generates a new talk room, based on the posts of the users belonging to the talk room. Specifically, in a case where the first user belonging to the talk room posts a file and instruction information including an instruction to execute a process on the file to the second user different from the first user, an individual talk room to which the second user belongs and which receives the post related to the file is generated separately from the talk room to which the instruction information is posted. The individual talk rooms are generated by the execution control unit 302 requesting the talk room server 20 to generate individual talk rooms. Here, the first user may nominate the second user by name, or by the position (for example, an employee or part-time job) or an attribute such as a group, or may designate the second user by words representing more than one person such as "everyone" or "all members". In addition, the second user may not belong to the talk room where the first user posts the instruction information. Further, the second user is automatically invited to the individual talk room, as the individual talk room is generated. It is assumed that the user and the attribute thereof are stored in advance in the chat bot server 30 or another server such as an authentication server by associating the user with the attribute. For example, in the case of storing the user and the attribute thereof in the chat bot server 30 in advance, the registration unit 301 registers the user and the attribute in advance in the storage 34 in association with each other. Examples of the attribute to be registered include the position (for example, a job title, or an employee or part-time job), affiliated organization (for example, xx office, OO store, Δ department, □□ sub-department, or the like), authority (for example, editability, printability, or the like), schedule (for example, attendance information such as work and holidays), and the like, which are registered as attributes for each user.

Further, in a case of generating an individual talk room, the execution control unit 302 generates an individual talk room to which instruction information, a file, or instruction information and file are posted. Further, the execution control unit 302 generates an individual talk room where processing such as printing or editing on the file can be executed according to the posting of the participating user.

That is, the execution control unit 302 also participates in the individual talk room as a chat bot, controls conversation with the users participating in the individual talk room, and controls execution of processing such as printing or editing according to the post from the user.

Further, the execution control unit 302 may prohibit the generation of the individual talk room, in a case where the instruction information is posted by a user other than the user having the predetermined authority as the first user.

Further, the execution control unit 302 may permit the use of an individual talk room of a user other than the second user, but may prohibit the use of the individual talk room of a user other than the second user according to certain conditions.

For example, the use of the individual talk room may be prohibited according to the content of the instruction information posted by the first user or the content of the posting made in addition to the instruction information. For example, the execution control unit 302 prohibits the use of the talk room of another user other than the second user, in a case where the first user posts "not to show it to other people". Further, in a case where the first user posts confidential information, the use of the individual talk room by users other than the second user may be prohibited.

Alternatively, the use of an individual talk room by the use of a user other than the second user may be prohibited depending on the attribute. For example, with respect to the individual talk room to which the second user belongs, only the user who belongs to the same organization as the second user is permitted to use. In other words, the use of users who do not belong to the same organization as the second user is prohibited. Specifically, in a case where the second user is the branch manager of branch A, the staff member of branch A is permitted to use the individual talk room, and the staff member of branch B is prohibited from using the individual talk room.

Alternatively, the use of an individual talk room may be prohibited according to the position (for example, only the employee is permitted to use).

Here, the use of an individual talk room includes participation in an individual talk room, posting to an individual talk room, use of electronic information including browsing of electronic files included in instruction information in an individual talk room, the execution of the process included in the instruction information on the file included in the instruction information in an individual talk room, and the like. Further, prohibiting the use of individual talk rooms may mean that participation in the individual talk room is not even permitted, participation is permitted but posting is not permitted, or participation is permitted but use of the file or execution of the process is not be permitted.

Further, the execution control unit 302 may generate the individual talk room including the third user, in a case where the first user posts the instruction information for a third user who does not belong to the talk room to which the instruction information is posted. Here, a case where the first user posts instruction information for a third user who does not belong to the talk room to which the instruction information is posted includes a case where the first user makes a request to the third user, and a case where the second user, who belongs to the talk room and receives the instruction from the first user, designates the third user as a proxy, and the first user authorizes it, thereby the first user indirectly designates the third user. In addition, in a case where the first user designates the second user, the execution control unit 302 generates an individual talk room including the second user but not including the third user. Thereafter, in a case where the second user designates the third user in the talk room to which the instruction information is posted, the third user may be added to the individual talk room.

Further, in a case where the first user posts instruction information for the third user, the execution control unit 302 may generate the individual talk room including the third user and users belonging to the talk room to which the instruction information is posted. Here, the user who belongs to the talk room to which the instruction information is posted is a user who is not the first user who is the person who posted the instruction information. For example, the user is a user who belongs to the same affiliated organization as the third user (for example, in a case where the first user is the manager of the head office, the store manager of the branch to which the third user belongs). Alternatively, in a case where the third user is designated by a user X other than the first user, the third user is the designated user X.

In addition, the execution control unit 302 may generate an individual talk room, in a case where the first user posts information indicating a due date or a deadline to the talk room, and the due date or the deadline corresponding to the posted information comes.

Alternatively, the execution control unit 302 may delete the generated individual talk room, in a case where the first user posts information indicating a due date or a deadline to the talk room, and the due date or the deadline corresponding to the posted information comes.

Alternatively, the execution control unit 302 may restrict use of the file included in the instruction information until a due date or a deadline corresponding to the posted information comes, in a case where the first user posts information indicating the due date or the deadline to the talk room.

Alternatively, the execution control unit 302 may restrict the execution of a process on the file included in the instruction information until a due date or a deadline corresponding to the posted information comes, in a case where the first user posts information indicating the due date or the deadline to the talk room.

Figure 7:
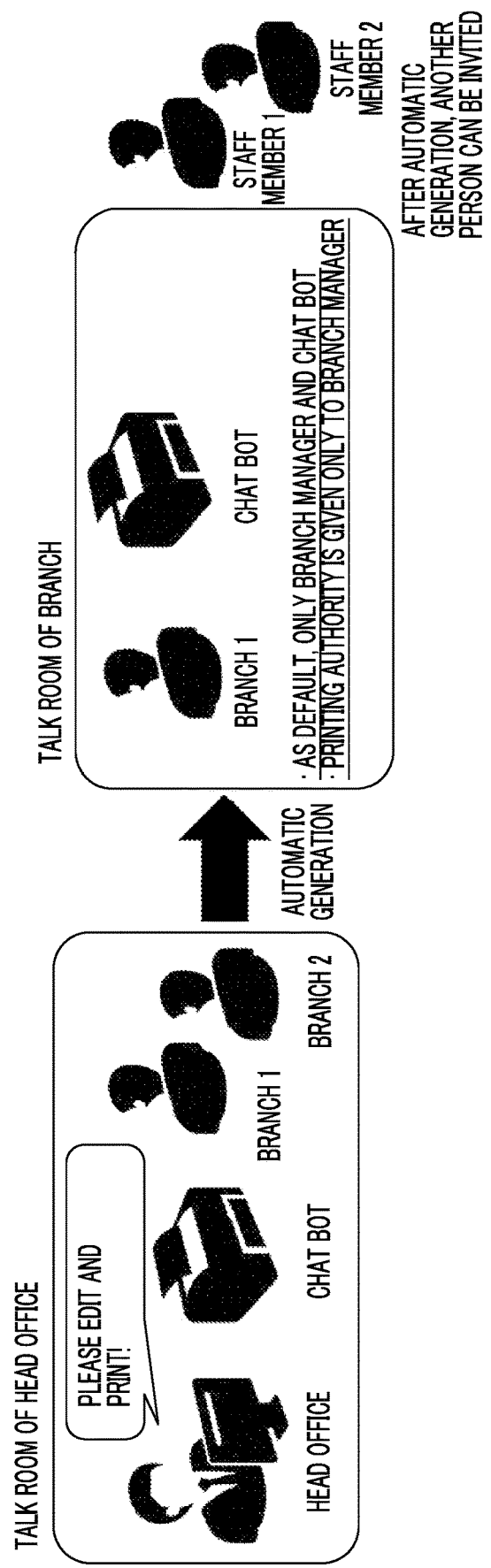
FIG. 7 is a diagram showing an example of generation of an individual talk room by an execution control unit.

Subsequently, generation of an individual talk room by the execution control unit 302 will be described with a specific example. FIG. 7 is a diagram illustrating an example of generation of an individual talk room by the execution control unit 302. In the example of FIG. 7, it is assumed that a chat bot is used in a retail store (for example, a supermarket, a convenience store, or the like). It is assumed that there is a manager of each of the head office and the branch in the talk room.

In a case where it is determined that the file editing and print settings are necessary at each branch office, based on the contents of the conversation between the managers of the head office and branch offices, in the talk room of the head office, the chat bot automatically generate an individual talk room for each branch office.

For example, as shown in FIG. 7, in a case where the manager of the head office posts a message instructing editing and printing (for example, "Please edit and print !") including the target file as instruction information, the execution control unit 302 generates a talk room for a branch as an individual talk room. The individual talk room is generated by the execution control unit 302 instructing the talk room server 20 to generate the individual talk room. The execution control unit 302 may post files to be edited and printed to the individual talk room, in a case of generating the individual talk room. The file may be uploaded to the document server 50, downloaded from the document server 50, acquired, and posted to an individual talk room. Further, in a case where a talk room for a branch is generated as an individual talk room, as shown in FIG. 7, as a default, only the branch manager and chat bots may participate in the talk room for a branch, and the printing authority may be given only to the branch manager. In addition, after an individual talk room is generated, a staff member (such as staff member 1 or staff member 2) of a branch may be invited on the individual talk room.

Figure 8:
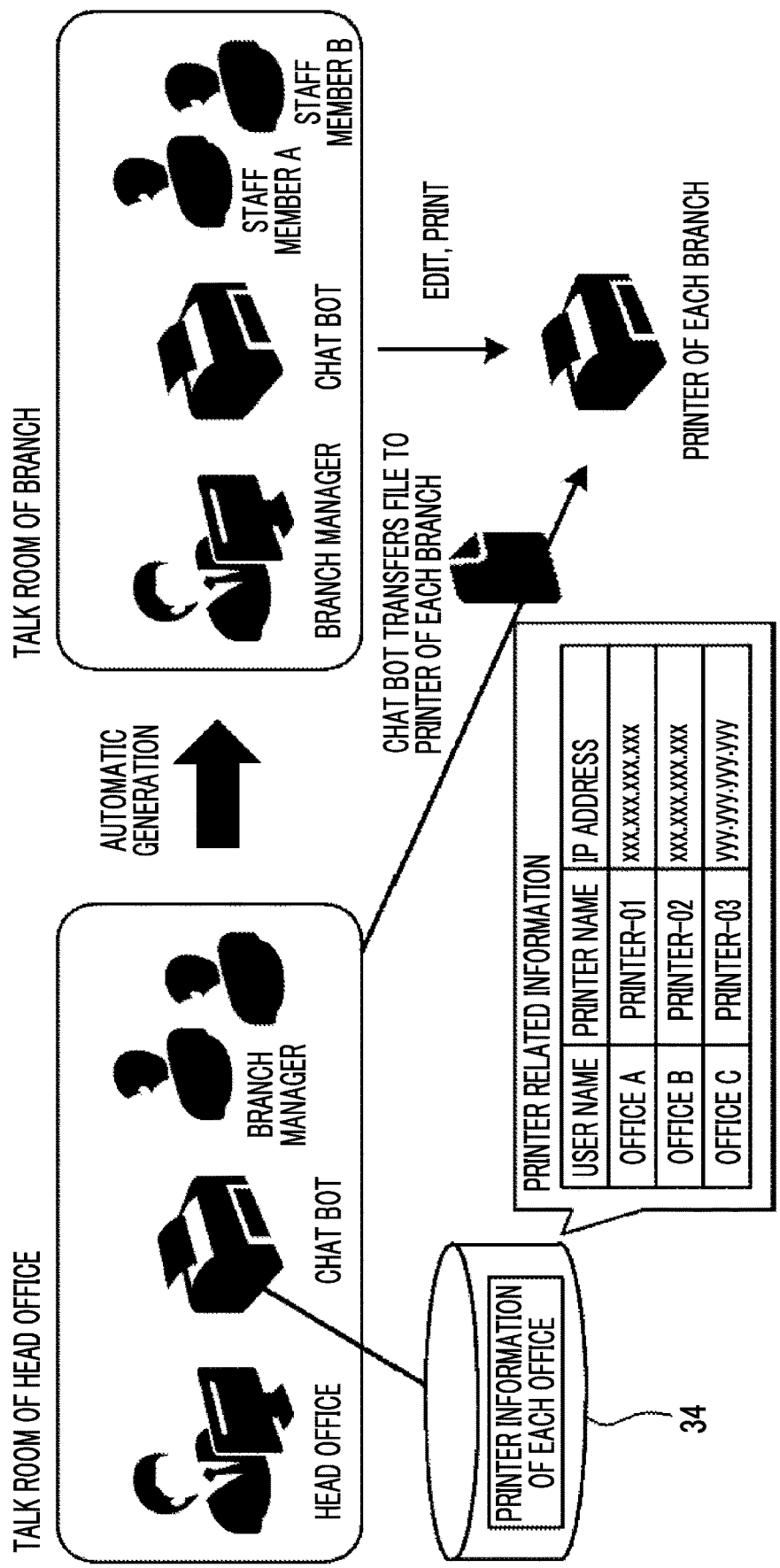
FIG. 8 is a diagram showing an example in which a chat bot transfers a target file to an image forming apparatus associated with each branch, in a case of generating an individual talk room.

In a case where the chat bot, that is, the execution control unit 302 transfers a target file to the image forming apparatus 40 associated with each branch in generating an individual talk room, as shown in FIG. 8, the execution control unit 302 holds in advance the printer related information of each branch in the storage 34, and transfers the file based on the printer related information.

Further, the execution control unit 302 may prohibit the generation of the individual talk room, in a case where a user other than the user having the predetermined authority such as the manager of the head office posts the instruction information to a talk room.

Figure 9:
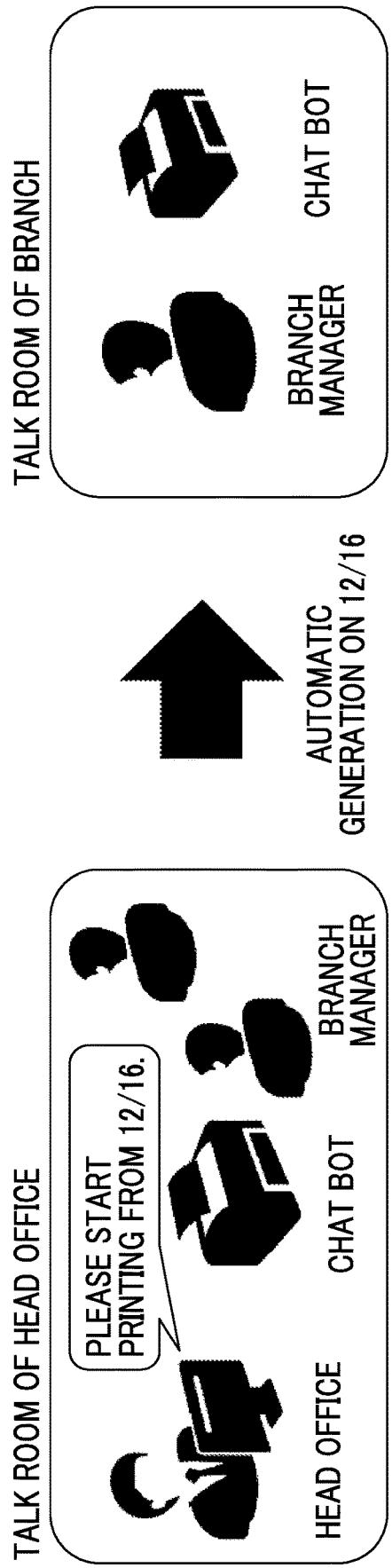
FIG. 9 is a diagram showing an example of generating an individual talk room in a case where a manager of a head office posts information indicating a due date or a deadline to a talk room, and the due date or the deadline corresponding to the posted information comes.

Further, in a case where a manager of a head office posts information indicating a due date or a deadline to a talk room, the execution control unit 302 may generate an individual talk room, at the time when the due date or the deadline corresponding to the posted information comes. For example, as shown in FIG. 9, in a case where the manager of the head office posts information such as "Please start printing from 12/16" as information indicating a due date or a deadline, the execution control unit 302 generates an individual talk room for the branch on December 16. Thus, in a case where the matter to be printed contains information that each branch does not want to be known until the due date or deadline comes, information leakage before the due date or deadline is prevented. Although FIG. 9 shows an example in which information including a print start instruction is posted together with information indicating a due date or a deadline, in a case where only information (for example, "from 12/16" or the like) simply indicating a due date or a deadline is posted, the execution control unit 302 may determine the information as information on the start of an individual talk room, and generate the individual talk room in a case where the corresponding day comes.

Figure 10:
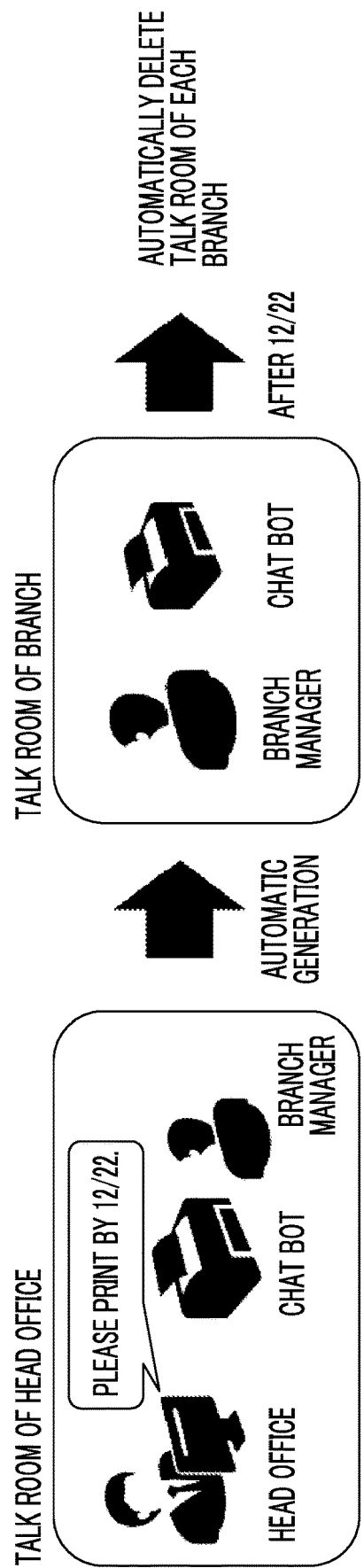
FIG. 10 is a diagram showing an example of deleting an individual talk room in a case where a manager of a head office posts information indicating a due date or a deadline to a talk room, and the due date or the deadline corresponding to the posted information comes.

Further, in a case where a manager of a head office posts information indicating a due date or a deadline to a talk room, the execution control unit 302 may delete an individual talk room, at the time when the due date or the deadline corresponding to the posted information comes. For example, as shown in FIG. 10, in a case where the manager of the head office posts information such as "Please print by 12/22" as information indicating a due date or a deadline, the execution control unit 302 deletes the individual talk room in the branch at the time when December 22 comes. Although FIG. 10 shows an example in which information including a printing instruction is posted together with information indicating a due date or a deadline, in a case where only information (for example, "until 12/22" or the like) simply indicating a due date or a deadline is posted, the execution control unit 302 may determine the information as information on the end of an individual talk room, and delete the individual talk room in a case where the corresponding day comes.

Further, in a case where the manager of the head office posts information indicating a due date or a deadline to the talk room, the execution control unit 302 may restrict the use of the file including the browsing of the file to be edited or printed, until the due date or time deadline corresponding to the posted information comes. Alternatively, in a case where the manager of the head office posts information indicating a due date or a deadline to the talk room, the execution control unit 302 may restrict the execution of a process including editing or printing on the file until the due date or the deadline corresponding to the posted information comes.

Specifically, the execution control unit 302 extracts keywords such as "edit", "print", and "user name", and keywords representing a due date or a deadline such as "from" and "until", and generates an individual talk room. For example, in a case where "edit" or "print", and a word designating a user such as "everyone", "all members", or "Mr. A" is recognized, an individual talk room is generated. For example, in a case where there is no keyword designating the user in the post such as "Please print it" in the talk room of the head office, an individual talk room is not generated. On the other hand, in a case where a keyword such as "All members, please print it" is included, an individual talk room is generated.

In addition, in a case where editing and printing are to be performed on different days, in a case where it is posted as "12/26 for editing, and 12/30 for printing", the execution control unit 302 generates an individual editable talk room on December 26, and allows printing from December 30. In a case where the date and time are designated, for example, when generating an individual talk room, it may be notified by posting to the individual talk room when the generation request has been made in the talk room of the head office. Further, in deleting an individual talk room in a case where the designated date and time come, the chat bot may notify when to delete the individual talk room, near the designated date (for example, the previous day, several days ago, or the like).

Figure 11:
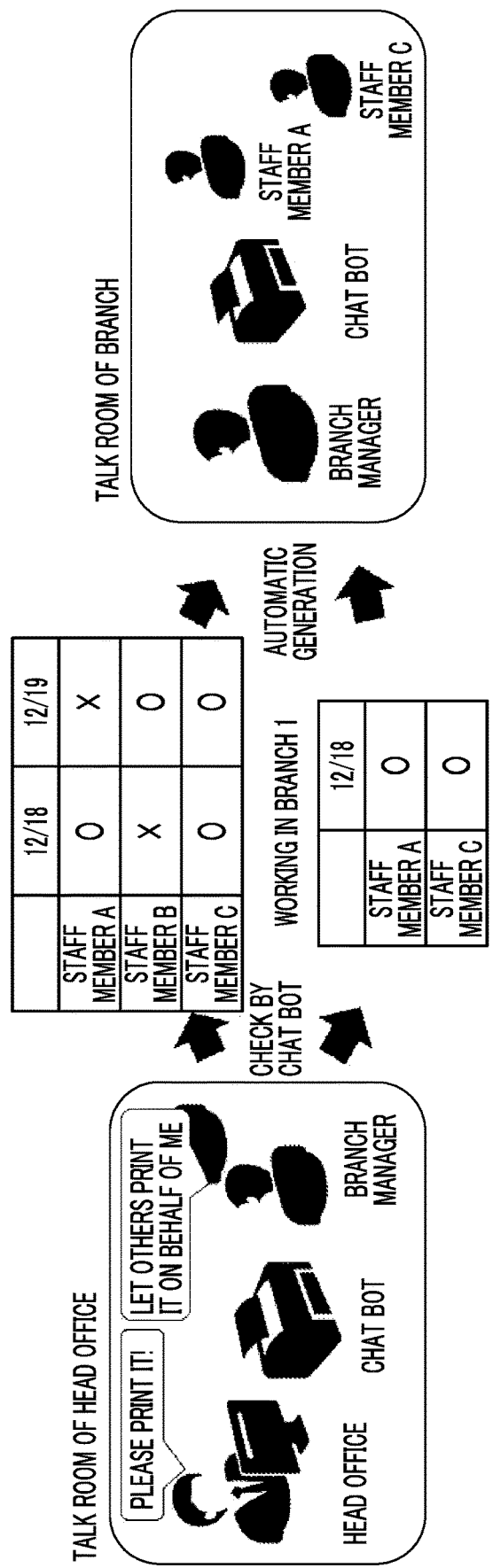
FIG. 11 is a diagram showing an example of generating an individual talk room in which a person other than the user who has posted instruction information such as the manager of the head office is included, in a case of generating an individual talk room.

Further, in a case of generating an individual talk room, the execution control unit 302 may generate the individual talk room in which a person other than the user who has posted instruction information such as the manager of the head office is included. For example, in a case where the manager of the branch office cannot print in the talk room of the head office, people whose are free of schedule at the branch or the people who are in the store may be checked and invited to the individual talk room. Specifically, as shown in FIG. 11, in the talk room of the head office, the manager of the head office posts instruction information such as "Please print it!", and the manager of a branch makes a post such as "Let others print it on behalf of me.", the execution control unit 302 may check the schedule and the working status at branch 1 of each of staff members working at branch 1, and invite staff members in a case of generating an individual talk room. The schedule and the working status of each staff member may be acquired from an external server such as an attendance management server and checked, or may be stored in advance in the storage 34 of the chat bot server 30.

Figure 12:
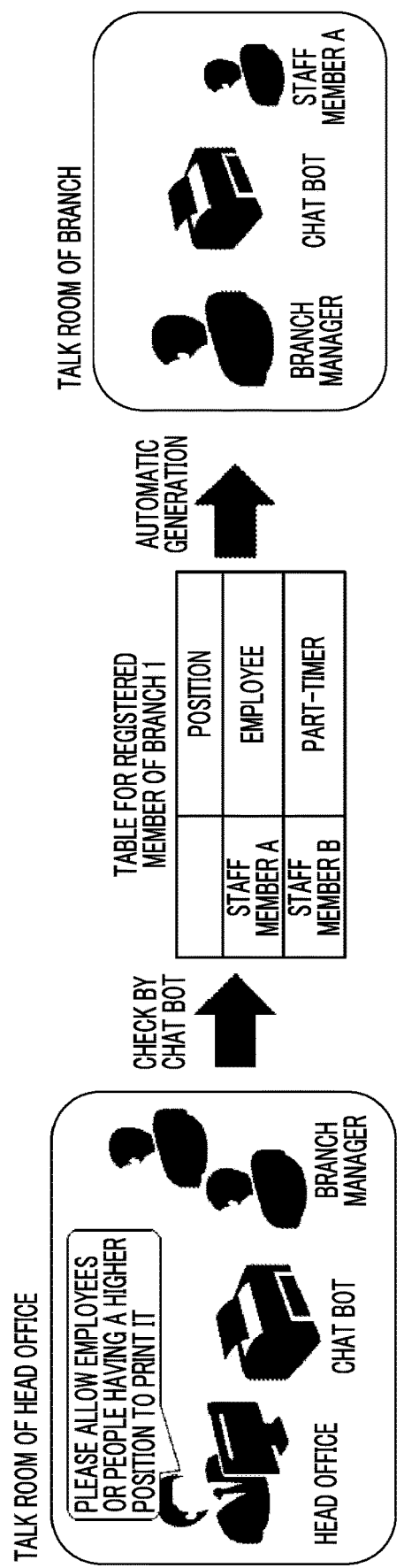
FIG. 12 is a diagram showing an example in which, in a case of making a person having a predetermined authority or attribute perform printing, the person is invited to an individual talk room in a case of generating the individual talk room based on a determination made from a conversation on a talk room.

In a case of making a person having a predetermined authority or attribute such as a person with a particular job title or more perform printing, the execution control unit 302 may invite the person to an individual talk room in a case of generating the individual talk room based on a determination made from a conversation on a talk room. For example, as shown in FIG. 12, in a case where the manager of the head office makes a post in the talk room of the head office, such as "Please allow employees or people having a higher position to print it", the execution control unit 302 checks the presence table of branch 1 and invites corresponding people in a case of generating an individual talk room. The presence table may be acquired from an external server such as an attendance management server and checked, or may be stored in advance in the storage 34 of the chat bot server 30.

Figure 13:
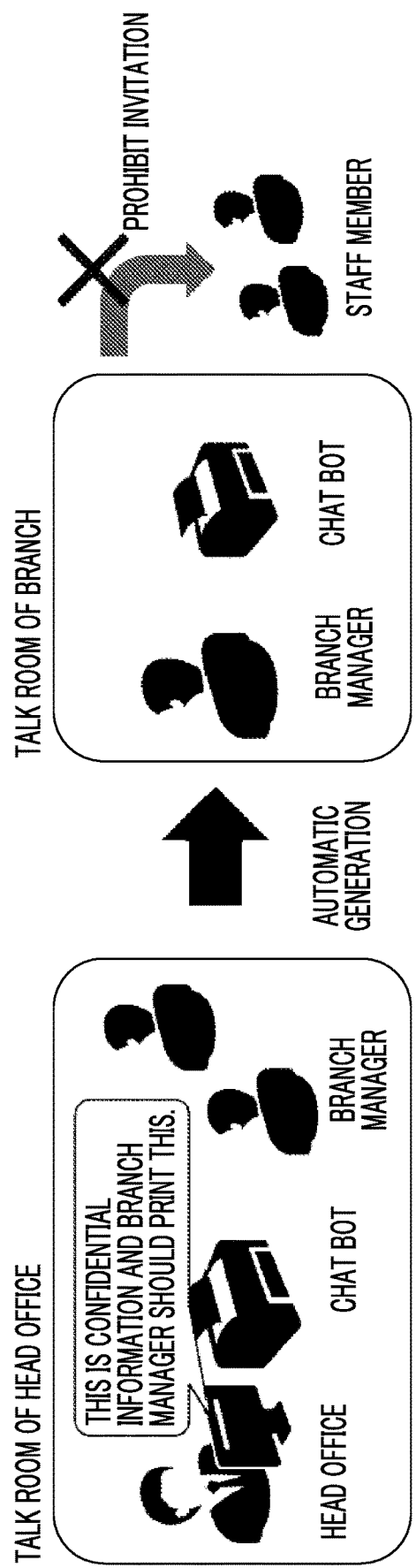
FIG. 13 is a diagram illustrating an example in which, in a case where information on confidential information is posted in a talk room where instruction information is posted, invitation of another person is prohibited, in a case of generating an individual talk room.

In addition, in a case where information on confidential information is posted in the talk room where the instruction information is posted, the execution control unit 302 may prohibit the invitation of another person in a case of generating an individual talk room. For example, as shown in FIG. 13, in a case where the manager of the head office posts information on confidential information such as "This is confidential information and the branch manager should print this" in the talk room of the main office, the execution control unit 302 generates an individual talk room and prohibits the invitation of others other than the branch manager.

Figure 14:
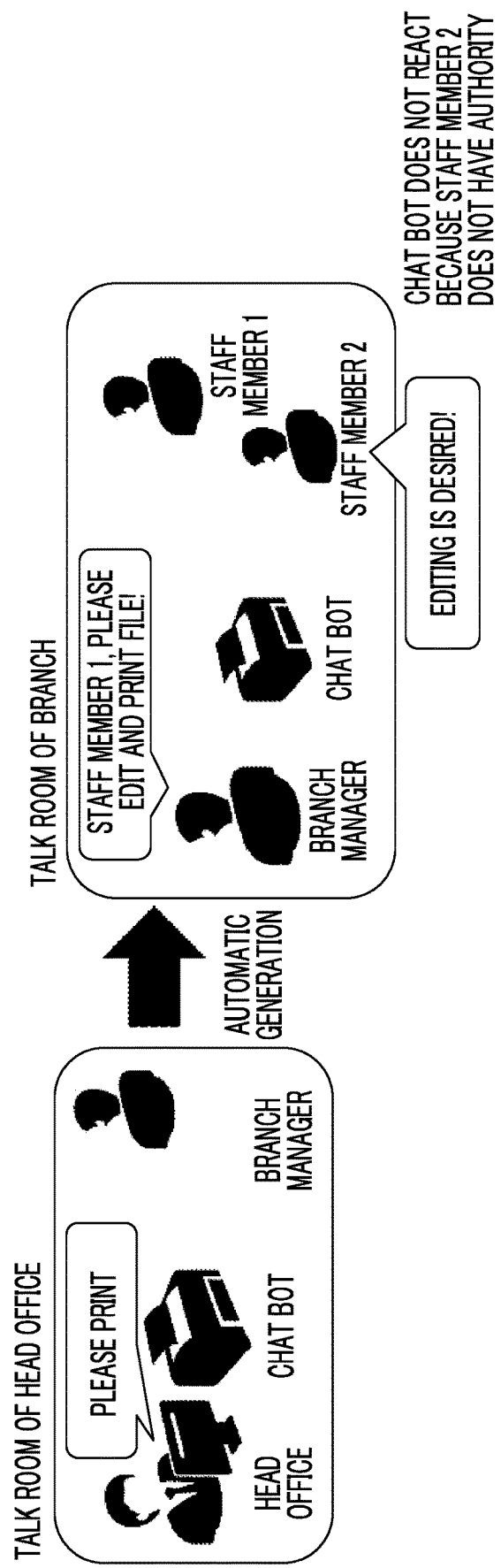
FIG. 14 is a diagram showing an example in which the branch manager grants a processing authority of printing and editing to another person in an individual talk room.

In addition, in the individual talk room, the branch manager may be able to grant a processing authority of printing and editing to another person. For example, as shown in FIG. 14, instruction information such as "please print" is posted in the talk room of the head office, and the execution control unit 302 generates an individual talk room. Then, in a case where the branch manager makes posting such as "Staff member 1, please edit and print a file!" to the individual talk room, in a case where the staff member 1 posts at least one of the print or edit instructions, the execution control unit 302 executes the corresponding process. On the other hand, in a case where the staff member 2 posts an instruction such as "Editing is desired!", the execution control unit 302 does not react and prohibits execution of the process by the staff member 2 who does not have the processing authority.

Figure 15:
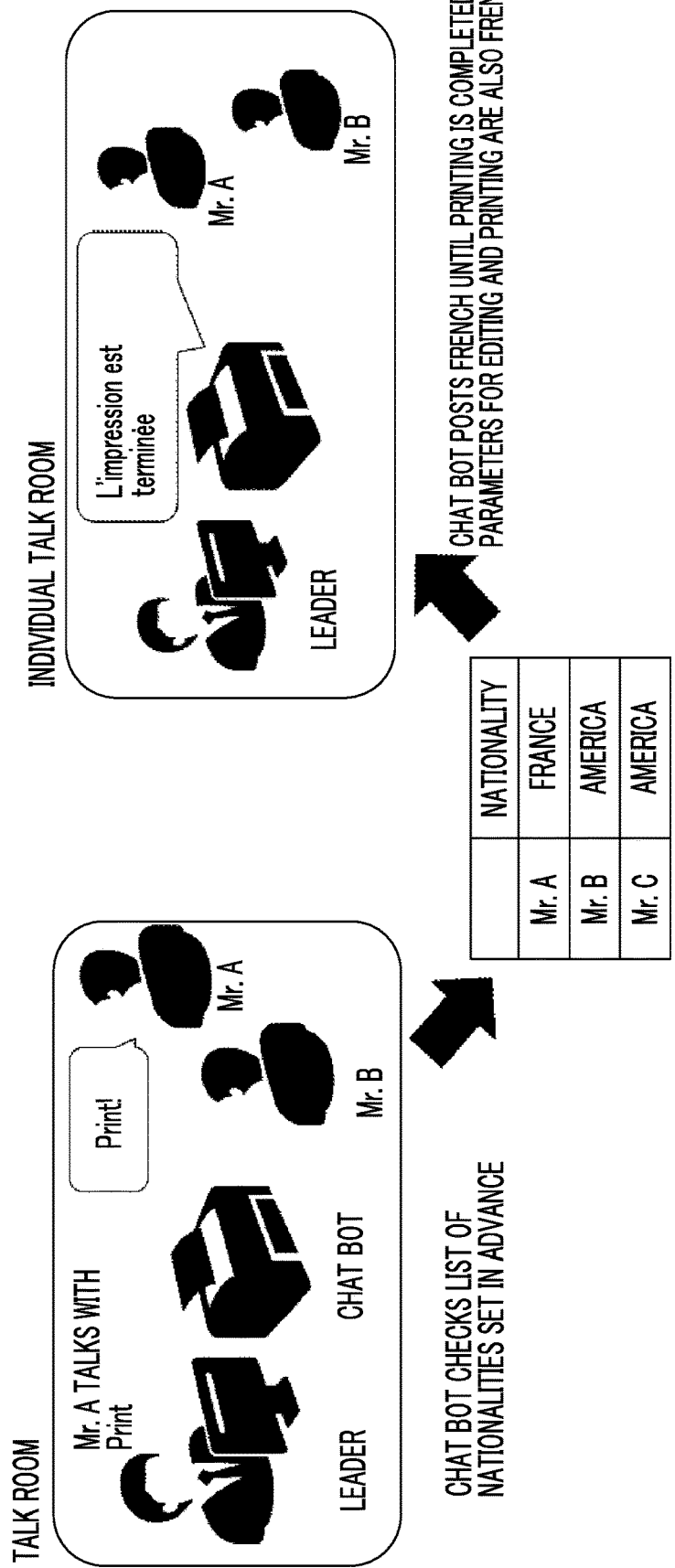
FIG. 15 is a diagram showing an example of generating an individual talk room for each nationality of a user and a language that can be spoken which are set in advance, in a case where instruction information is posted to the talk room.

Further, assuming a case other than a retail store, it may be possible to change the language spoken by chat bots in individual talk rooms, depending on the nationality of the user and the languages spoken. For example, in a case where the instruction information is posted to the talk room, the execution control unit 302 may generate an individual talk room for each of nationalities of the users and languages that can be spoken which are set in advance. More specifically, as shown in FIG. 15, in a case where the manager posts "Print" or the like in the talk room, the execution control unit 302 checks the list of nationalities of the users and languages that can be spoken which are set in advance. Then, the execution control unit 302 generates an individual talk room for each of the nationalities and languages that can be spoken. In the individual talk room, the chat bot performs posting in the language set in the individual talk room until printing is completed. The example of FIG. 15 shows an example in which the chat bot posts French until printing is completed. In this example, parameters for editing and printing are also French.

Figure 16:
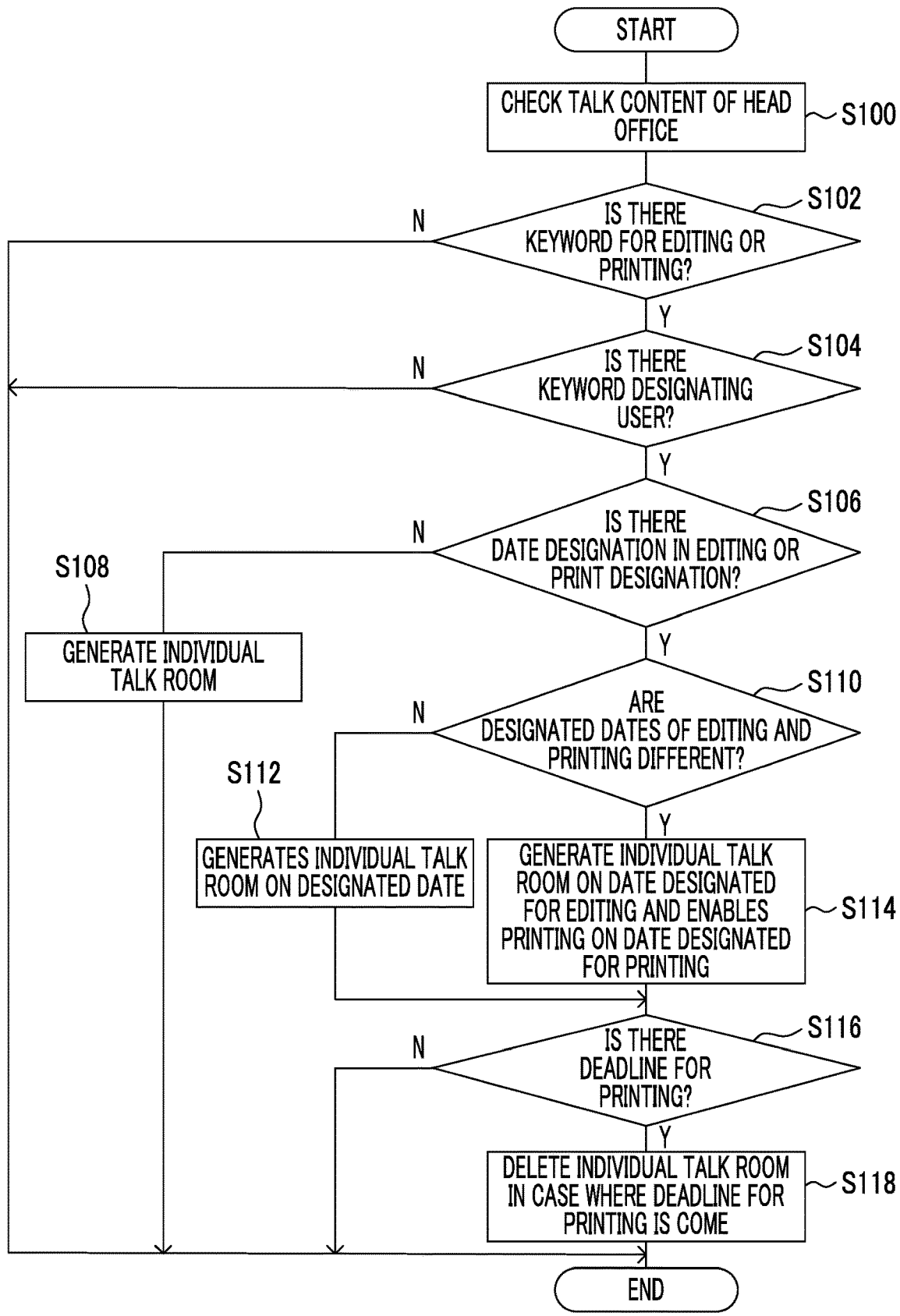
FIG. 16 is a flowchart showing an example of a flow of a process performed by the chat bot server in the control system according to the present exemplary embodiment.

Subsequently, an operation of the chat bot server 30 in the control system 11 according to the present exemplary embodiment configured as described above will be described. FIG. 16 is a flowchart showing an example of the flow of a process performed by the chat bot server 30 in the control system 11 according to the present exemplary embodiment. The process is executed by the CPU 31 reading out a control program stored in the ROM 32 or the storage 34 and developing the program into the RAM 33 for execution. In addition, in FIG. 16, similarly to the above-described example, the case where a chat bot is utilized between a head office and a branch office in a retail store will be described as an example.

In step S100, the CPU 31 as the execution control unit 302 checks the talk content of the head office, and proceeds to step S102. That is, the information posted to the talk room is acquired from the talk room server 20, and the contents of the talk are checked.

In step S102, the CPU 31 determines whether there is a keyword for editing or printing in the checked talk content. In a case where the determination is negative, the process ends without generating an individual talk room. In a case where the determination is positive, the process proceeds to step S104.

In step S104, the CPU 31 determines whether or not there is a keyword designating a user in the checked talk content. In a case where the determination is negative, the process ends without generating an individual talk room. In a case where the determination is positive, the process proceeds to step S106.

In step S106, the CPU 31 determines whether or not there is a date designation in editing or print designation in the checked talk content. In a case where the determination is negative, the process proceeds to step S108, and in a case where the determination is positive, the process proceeds to step S110.

In step S108, the CPU 31 generates an individual talk room, ends the process, and performs a process related to the individual talk room. That is, processes such as editing and printing are performed according to the posting in the individual talk room. In addition, in a case of generating an individual talk room, the talk room is generated including the user according to the talk contents in the talk room of a head office. Alternatively, an individual talk room is generated and then a user corresponding to the talk contents in the talk room of a head office is invited.

In step S110, the CPU 31 determines whether the designated dates of editing and printing are different. In a case where the determination is negative, the process proceeds to step S112, and in a case where the determination is positive, the process proceeds to step S114.

In step S112, the CPU 31 generates an individual talk room on the designated date, and proceeds to step S116.

On the other hand, in step S114, the CPU 31 generates an individual talk room on the date designated for editing, enables printing on the date designated for printing, and proceeds to step S116.

In step S116, the CPU 31 determines whether there is a deadline for printing in the checked talk content. In a case where the determination is negative, the process ends, and in a case where the determination is positive, the process proceeds to step S118.

In step S118, in a case where the deadline for printing has come, the CPU 31 deletes the individual talk room and ends the series of processes.

In the above exemplary embodiment, although the case where the talk room server 20, the chat bot server 30, and the document server 50 are separate devices is exemplified, the present invention is not limited thereto. For example, at least two or more functions of the talk room server 20, the chat bot server 30, and the document server 50 may be realized by one server. Alternatively, a part of the functions of the talk room server 20, the chat bot server 30, or the document server 50 may be performed by another server.

Further, the process performed by the chat bot server 30 according to the above exemplary embodiment may be a process performed by software, a process performed by hardware, or a process combining both. In addition, the processes performed by the chat bot server 30 may be stored as a program in a storage medium and be distributed.

Further, the program for operating the chat bot server 30 may be provided by a computer readable recording medium such as a universal serial bus (USB) memory, a flexible disk, and a compact disk read only memory (CD-ROM), or may be provided online through a network such as the Internet. In this case, the program recorded on the computer readable recording medium is usually transferred to and stored in a memory, a storage or the like. Further, this program may be provided, for example, as single application software, or may be incorporated into the software of each device as one function of the chat bot server 30.

In addition, the present invention is not limited to the above, and it goes without saying that various modifications can be made without departing from the scope of the invention, in addition to the above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising a hardware processor configured to:
generate a talk room where each of a plurality of users who participates the talk room posts and browses information, wherein the plurality of users comprises a first user, a second user, and a third user, wherein the first user has a predetermined authority, the second user and the third user do not have the predetermined authority;
check posting content of the first user in the talk room to determine whether the posting content of the first user includes a file and instruction information including an instruction to execute processing on the file for the second user different from the first user;
generate an individual talk room which receives the post related to the file, separately from the talk room to which the instruction information is posted, and invite the second user to the individual talk room, in response to determining that the posting content of the first user in the talk room includes the file and the instruction information for the second user,
wherein in a case where the instruction information is posted by the third user in the talk room, the hardware processor prohibits generation of the individual talk room by the instruction information posted by the third user,
wherein the instruction information includes a process for execute printing, a process for editing a file, and a process for sending and receiving information between an information processing apparatus and another apparatus.

2. The control device according to claim 1, wherein the instruction to execute the processing is an instruction of editing or output.

3. The control device according to claim 2, wherein in a case where the instruction information includes the instruction of editing, the hardware processor generates a talk room where editing on the file is to be executed according to a post of a participating user.

4. The control device according to claim 2, wherein in a case where the instruction information includes the instruction of output, the hardware processor generates a talk room where the output of the file is to be executed according to the post of the participating user.

5. The control device according to claim 1, wherein the hardware processor prohibits use of the individual talk room by users other than the second user, based on contents of the instruction information or contents of a post by the first user made in addition to the instruction information.

6. The control device according to claim 5, wherein in a case where the instruction information includes confidential information, or in a case where the first user posts confidential information in addition to the instruction information, the hardware processor prohibits use of the individual talk room by users other than the second user.

7. The control device according to claim 1, wherein in a case where the first user posts the instruction information for a fourth user who does not belong to the talk room to which the instruction information is posted, the hardware processor generates the individual talk room including the fourth user.

8. The control device according to claim 7, wherein in a case where the first user posts the instruction information for the fourth user, the hardware processor generates the individual talk room including the fourth user and the plurality of users belonging to the talk room to which the instruction information is posted.

9. The control device according to claim 7, wherein the fourth user is a user having an attribute instructed by the first user.

10. The control device according to claim 1,
wherein the second user is a user having an attribute instructed by the first user.

11. The control device according to claim 1,
wherein in a case where the first user posts information indicating a due date or a deadline to the talk room, and the due date or the deadline corresponding to a posted information comes, the hardware processor generates the individual talk room.

12. The control device according to claim 1, wherein the hardware processor deletes the individual talk room generated by the hardware processor, in a case where the first user posts information indicating a due date or a deadline to the talk room, and the due date or the deadline corresponding to the posted information comes.

13. The control device according to claim 1, wherein the hardware processor, in a case where the first user posts information indicating a due date or a deadline to the talk room, restricts use of the file included in the instruction information until the due date or the deadline corresponding to the posted information comes.

14. The control device according to claim 1, wherein the hardware processor, in a case where the first user posts information indicating a due date or a deadline to the talk room, that restricts execution of processing on the file included in the instruction information until the due date or the deadline corresponding to the posted information comes.

15. The control device according to claim 1, wherein the hardware processor controls execution of processing corresponding to the instruction information posted for the second user, in the individual talk room.

16. The control device according to claim 15,
wherein in a case where the second user makes a post for giving an authority for the instruction information to a fourth user belonging to the individual talk room, the hardware processor executes processing corresponding to the instruction information, according to a post of the instruction from the fourth user.

17. The control device according to claim 1,
wherein the hardware processor generates the individual talk room to which the instruction information or the file is posted.

18. A control system comprising: a hardware processor, configured to:
provide a talk room where each of a plurality of users who participates the talk room posts and browses information wherein the plurality of users comprises a first user, a second user, and a third user, wherein the first user has a predetermined authority, the second user and the third user do not have the predetermined authority; and
check posting content of the first user in the talk room to determine whether the posting content of the first user includes a file and instruction information including an instruction to execute processing on the file for the second user different from the first user,
generate an individual talk room which receives the post related to the file, separately from the talk room to which the instruction information is posted, and invite the second user to the individual talk room, in response to determining that the posting content of the first user in the talk room includes the file and the instruction information for the second user,
wherein in a case where the instruction information is posted by the third user in the talk room, the hardware processor prohibits generation of the individual talk room by the instruction information posted by the third user,
wherein the instruction information includes a process for execute printing, a process for editing a file, and a process for sending and receiving information between an information processing apparatus and another apparatus.

19. A non-transitory computer readable medium storing a control program causing a computer to function as the control device according to claim 1.

* * * * *